Figures 1, 2:
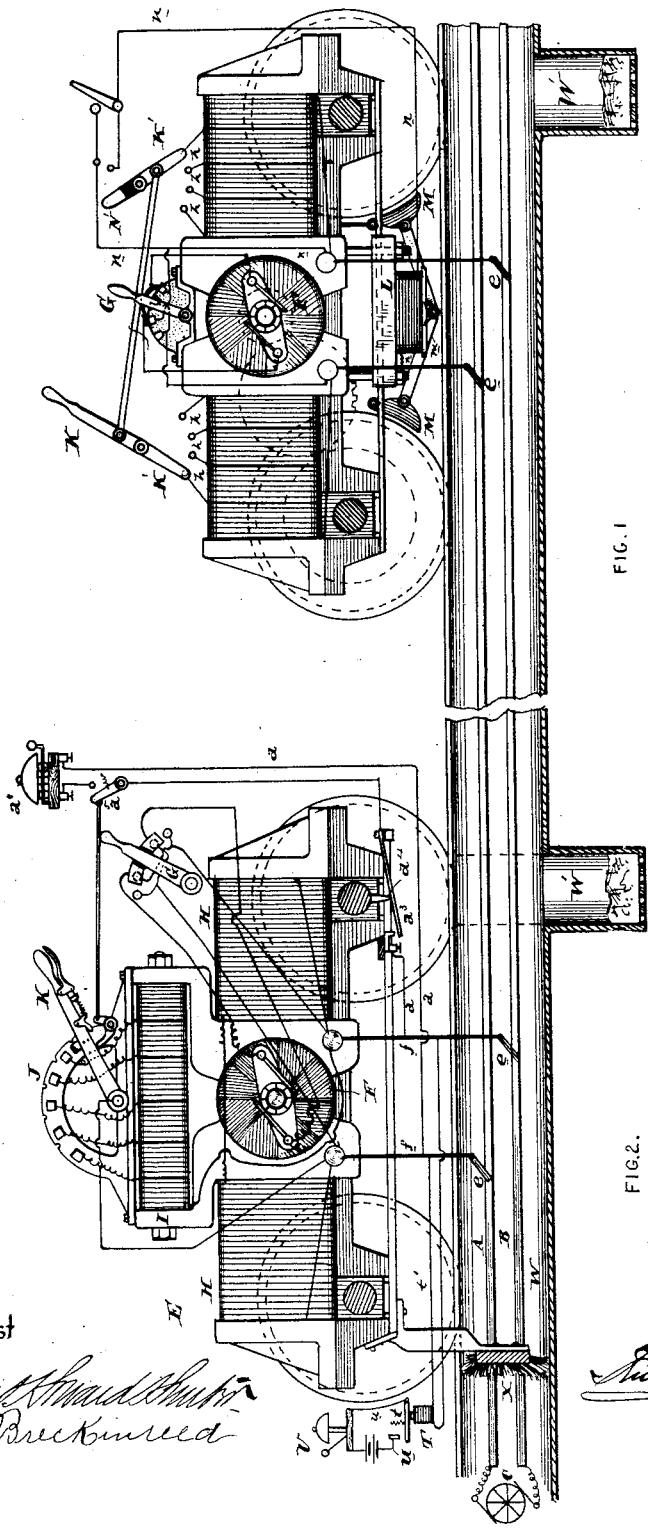

(No Model.)

R. M. HUNTER.
ELECTRICALLY PROPELLED VEHICLE.

No. 425,076. Patented Apr. 8, 1890.

Attest

Inventor

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRICALLY-PROPELLED VEHICLE.

SPECIFICATION forming part of Letters Patent No. 425,076, dated April 8, 1890.

Application filed March 18, 1886. Serial No. 195,742. (No model.)

*To all whom it may concern:*

Be it known that I, RUDOLPH M. HUNTER, of the city and county of Philadelphia and State of Pennsylvania, have invented an Improvement in Electrically-Propelled Vehicles, of which the following is a specification.

My invention has reference to electrically-propelled vehicles; and it consists of certain improvements fully set forth in the following specification and shown in the accompanying drawings, which form part thereof.

My object is to provide an electrically-propelled vehicle with means for arresting its movement in the form of an electrically-actuated brake. The motor and brake are operated from the same source of electric power, which may be either line-conductors or batteries.

In the drawings, Figure 1 is a sectional elevation of an electrically-propelled vehicle and railway embodying my invention, and Fig. 2 is a similar view of a modification of same.

A and B are the line-conductors, and, if desired, may be used as working-conductors also.

C is the generator.

W is the underground conduit, having the longitudinal slot $w$ at its upper part and wells W′ at intervals opening from the bottom. The working-conductors are supported within this conduit.

E are the motors, and are electrically connected to the working-conductors by wires $f$ and brushes $e$. The armatures F of the motors are in multiple-arc connection with the field-magnets H, and the currents in the armatures may be reversed by switches G. The field-magnets H may be wound in separate coils, or the coils may be tapped, as at $h$; and switches K′, operated by handle K, may be used to vary the power of the field-magnets by increasing or decreasing the number of coils in circuit on the cores.

In place of changing the power of the field-magnets as above described, one or more separate or regulating generator-magnets I may be connected with the poles or cores of the field-magnets and may be traversed by a separate current than that passing through the field, and its magnetic strength may be varied by a switch-lever K, working with the contacts J in circuit with various portions of the magnets I, so that any desired portion of the coils may be cut out to decrease the strength of the field, or vice versa. By this means it is seen that if it is desired to stop the train the driver has simply to operate the lever K to increase the field of force, increasing the counter electro-motive force until it equals the initial electro-motive force. Then the motor will neither act as a motor or as a dynamo; but now as the field of force is increased the counter electro-motive force becomes the stronger and the motor acts as a brake.

The cleaning-brush X is connected to the motor by a flat shank X′, which extends up through the slot of the conduit, and the brush would be preferably made of insulating material, so that there will be no short-circuiting of the line-conductors. The brush may be of bristles fastened to a wooden base and this base attached to a flat metallic shank.

L is a friction-brake armature, and may be attracted by the motor-magnets or by auxiliary-magnets, and, if desired, may be made as a core to work in a helix, as shown at L′. This armature L is connected with the toggle-joint $m$, adapted to actuate the brake-shoes M. To make this brake more powerful, I provide the armature with a helix N in shunt-circuit $n$ with the motor, and a switch N′ may be used to open or close the circuit $n$ when the brake is to be taken off or put on. When the motor is normally running, the armature L is out of magnetic attraction sufficient to put on the brake; but if the circuit $n$ be closed it will then be attracted to put on the friction-brake. Again, if the motor is being braked by the counter electromotive force, the increase of the field will automatically put on the friction-brakes if the increase in the field of force is such as to insure the attraction of the armature L. It is evident that the brake-armature L may be so designed that with the greatest increase of the field of the motor by increase of the counter electro-motive force the attraction may be such that the instant the circuit $n$ is closed the armature L, becoming magnetized, instantly applies the friction-brake to stop the train after the counter electro-motive force has acted to slow it down, thereby enabling the train to be stopped exactly at the right place. The switch N may be made to operate by the lever K after it has been moved to put on the greatest counter electro-motive force.

U is an electric signal, and is in a local circuit $u$, having its own battery and a switch $t$, which latter is actuated by an electro-magnet T in a circuit $t'$, connecting with the source of electric energy. This apparatus is for signaling the operator on the vehicle when two cars come too close together, as fully set out in my application No. 299,169, filed February 8, 1889. An alarm electric bell $a'$ is in a circuit $a$, connecting with the source of electric energy, and may have a switch $a^5$, controlled by the operator directly or through movement of the handle K. This circuit $a$ may have a circuit-breaker $a^3$, which is operated by a projection $a^4$ on the axle, the object being to intermittently operate the signal. These alarms are not claimed in this application. This alarm may be automatically put into action upon slowing down the motor by connecting with the switch a link-and-lever connection $a^6$, which may be liberated upon operating the lever K to slow the motor, and thereby allow the switch $a^5$ to close and sound the alarm. It is readily understood that if desired the interrupter $a^2$, or this last-mentioned device for operating the alarm upon slowing down the motor, may be omitted and the alarm wholly controlled by the operator.

While I prefer the constructions shown I do not limit myself to the details, as they may be modified without departing from my invention.

Having now described my invention, what I claim as new, and desire to secure by Letters Patent, is—

1. An electric-railway motor having its field-magnets formed of a series of coils, those on each magnet connected in series, in combination with an electric circuit for supplying electricity to said magnets and switches to simultaneously put in or out of circuit any number of coils of each field-magnet to vary the power or speed of the motor, substantially as and for the purpose specified.

2. An electric-railway motor having its field-magnets formed of a series of coils and its armature arranged in multiple arc or shunt connection with said field-magnets, in combination with working-conductors and connecting devices for supplying electricity to said magnets, switches to simultaneously put in or out of circuit any number of coils of each field-magnet to vary the power or speed of the motor, and switch devices for reversing the direction of the current through the armature, substantially as and for the purpose specified.

3. In an electric railway, the combination of permanent barred working-conductors independent of the rails with an electric motor, connecting brushes or devices insulated from the rails to supply electricity to the motor from said conductors, and a switch to reverse the direction of the current through the armature, substantially as and for the purpose specified.

4. In an electric railway, the working-conductors, in combination with a motor or car provided with traveling brushes or connecting devices for receiving electricity from the conductors, an auxiliary electro-magnet to increase the power of the field-magnets of the motor formed with a series of helices, and a switch to put one or more of the helices into circuit, substantially as and for the purpose specified.

5. In an electric railway, the working-conductors, in combination with a motor or car provided with traveling brushes or connecting devices for receiving electricity from the conductors, an auxiliary electro-magnet to increase the power of the field-magnets of the motor arranged in multiple arc or shunt connection with the field-magnets of the motor formed with a series of helices, and a switch to put one or more of the helices into circuit, substantially as and for the purpose specified.

6. In an electric railway, a traveling electric vehicle, an electric motor on said vehicle, a source of electric energy, an electric brake, a brake-magnet having its coils made in sections and normally connected in series, a brake-circuit including said magnet-coils, and switch devices to put one or more of said coils out of circuit without disturbing the series connection of those remaining in circuit.

In testimony of which invention I hereunto set my hand.

RUDOLPH M. HUNTER.

Witnesses:
RICHD. S. CHILD, Jr.,
E. M. BRECKINREED.